US007017151B1

(12) United States Patent
Lopez et al.

(10) Patent No.: US 7,017,151 B1
(45) Date of Patent: Mar. 21, 2006

(54) SYSTEM AND METHOD FOR REAL-TIME APPLICATIONS MODIFICATION

(75) Inventors: Mauricio Lopez, Atlanta, GA (US); Mark A. Kirkpatrick, Conyer, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 528 days.

(21) Appl. No.: 10/025,774

(22) Filed: Dec. 26, 2001

(51) Int. Cl.
*G06F 9/44* (2006.01)

(52) U.S. Cl. .................... 717/127; 717/111; 717/125; 717/128; 717/129

(58) Field of Classification Search ................ 717/174, 717/168, 110–113, 124–129; 709/330, 4, 709/517; 707/517, 4
See application file for complete search history.

(56) References Cited

U.S. PATENT DOCUMENTS 6,662,363 B1 * 12/2003 Miyamoto ................... 717/174
6,681,389 B1 * 1/2004 Engel et al. ................. 717/173

OTHER PUBLICATIONS http://web.archive org/web/20010630005237/http://www.edm2.com/0601/rmil.html, Introduction to Java Remote Method Invocation (RMI) by Chris matthews, Jun. 30, 2001.*
http://my.execpc.com/~gopalan/java/java_rmi.html, "Java Remote Method Invocation" by Gopalan Suresh Raj, Jul. 06, 1998.*
"JAVA In a Nutshell" by David Flanagan, 1997, O'Reilly & Associated, Inc.*
"Cross-Debuggin Real-Time Ada Programs", Greg Burns, 1987 ACM 0-89791-240-3/87/0500-0021.*
"A Probe-Based Monitoring Scheme for an Object-Oriented, Distributed Operating System", Partha Dasgupta, OOPSLA '86 Proceedings, Sep., 1986.*
"Introduction of Java Remote Method Invocation (RMI)", Chris Matthews, web.archive.org/web/20010630005237.*
Narasimhan, N. et al., "Interception in the Aroma System", Department of Electrical and Computer Engineering, University of California, 2000, p. 107-115.
Chuang, Tyng-Ruey et al., "Non-Intrusive Object Introspection in C++: Architecture and Application", Institute of Information Science, 1998, p. 312-321.

* cited by examiner

*Primary Examiner*—Tuan Dam
*Assistant Examiner*—Chih-Ching Chow
(74) *Attorney, Agent, or Firm*—Withers & Keys, LLC

(57) ABSTRACT

An object shell console allows maintenance personnel to upgrade or otherwise modify an executing computer application without suspending or terminating the application's execution. The object shell console attaches to the application while it is executing and extracts program data. The program data is displayed to a maintenance person. Based on the program data, the maintenance person upgrades or otherwise modifies the application. Upgrades include corrections to reflect system upgrades and changing the behavior of the application. The application is modified without time-consuming and expensive program builds.

11 Claims, 6 Drawing Sheets

SYSTEM AND METHOD FOR REAL-TIME APPLICATIONS MODIFICATION

BACKGROUND

1. Field of the Invention

The present invention relates generally to the field of diagnostic tools for computer software. More specifically, the present invention relates to real-time upgrade or other modification of a computer application without terminating or suspending the application's execution.

2. Background of the Invention

Web-based software applications often execute on application server platforms. Examples of application server platforms include systems such as iPlanet or Weblogic. Due to their nature, it is desirable to keep web-based applications, highly available. Thus, minimizing their downtime is a critical goal. However, this goal can pose significant problems in the trouble-shooting and maintenance environment of most information technology (IT) facilities. Downtime is often required to debug software problems or to upgrade systems. Downtime is also required to maintain systems or find and repair errors. This downtime can have enormous impacts on IT facilities' operations and viability.

Conventional software maintenance tools do not adequately solve the problem of modifying or upgrading an application during its normal unimpeded execution. There are several ways of upgrading or modifying applications in conventional systems. In one technique, upgrades or modifications are performed only at scheduled maintenance times. At the scheduled maintenance time, systems personnel are provided a window of time in which any maintenance operations should be performed. Systems personnel make any required changes, and restart the application within the maintenance window. One problem with the scheduled-maintenance-window approach is that maintenance windows may be scheduled only once or twice a day or even less often. Consequently, there is often a significant delay between the time maintenance is required to resolve non-routine problems, and when the systems personnel are actually allowed to perform it.

Another problem with the scheduled-maintenance-window approach is that a system operator must be available at the scheduled maintenance time. Due to the dynamic nature of IT facilities, system operators might be assigned to other tasks at the scheduled maintenance time. If a system operator is not available to perform an upgrade during the allotted time, the upgrade must wait until the next scheduled maintenance time. Unfortunately, the next scheduled maintenance time could be hours or days away. Moreover, there is no guarantee that a system operator will be available to complete the required maintenance, because even a simple upgrade may take a significant amount of time to install.

A second maintenance technique is a reactive strategy—system maintenance or upgrades are performed only when catastrophic failures have occurred or are imminent. Consequently, the second option is used primarily in emergency situations, such as when a system component fails. When the emergency occurs, the application is terminated so that it can be diagnosed or repaired. After the appropriate maintenance or upgrade is completed, the application is restarted using the updated instructions or data.

The delay between diagnosis and repair of a problem can be significant. Due to the high premium most web-based applications place on availability, this is an unacceptable solution. Another problem with suspending or terminating an application is that any transaction currently in progress is interrupted, and often lost, when the application is terminated.

Another conventional technique to handle error conditions is to account for possible errors in the application software in the form of contingency software to handle error conditions. Contingency software enables an application to react to an error in a graceful or predictable manner. The contingency software is embedded in the application. Consequently, the contingency software is compiled as a part of the application and becomes part of the application's executable code.

One drawback of using the contingency software is that it becomes a fixed part of an application's executable code. Consequently, it is not dynamic. Thus, if an unexpected contingency occurs, there is no software in the program to accommodate it. For this reason, contingency software embedded an application is an incomplete solution.

Consequently, there is a need for a computer software diagnostic tool that allows system operators to maintain or upgrade a computer application without terminating or suspending the application's operation or adding to the size of executable code.

SUMMARY OF THE INVENTION

The present invention solves the foregoing problems in the art by providing a system operator with an interface that allows the system operator to upgrade or otherwise modify a computer application while it is executing. The upgrade or other modification is performed without suspending or terminating the application being analyzed.

Preferably, an object shell console is used to connect to an executing application. The object shell console extracts program data from the executing application for display to a system operator. For example, the object shell console can obtain and display information regarding classes, methods and fields comprising a particular application. In addition, the value of the variables used in or passed to or from those methods, and any other data that relates to the program structure of the executing application are also displayed to the system operator.

In one embodiment, the present invention is a system for modifying or upgrading an application during execution without suspending or terminating the application. An application to be analyzed executes on a computer such as an application server. An object shell console executing on an administration client attaches to the application to extract program data from the application without suspending the application or causing the application to terminate. The program data is presented to a system operator in a graphical user interface. A command line is also available to the system operator. The system operator enters a command on the command line. When executed, the command causes modification of the application without suspending or terminating the application.

In another embodiment, the present invention is a method for modifying or upgrading a computer application while it is executing. The method includes the steps of connecting to the computer application and extracting program data from the computer application without suspending or terminating the computer application. The method also includes the step of displaying the program data to a system operator in a graphical user interface. The method further includes the step of accepting a command from the system operator.

Finally, the method includes the step of executing the command to cause the application to be modified or upgraded without suspending or terminating the application.

DETAILED DESCRIPTION OF THE INVENTION

Figure 1:
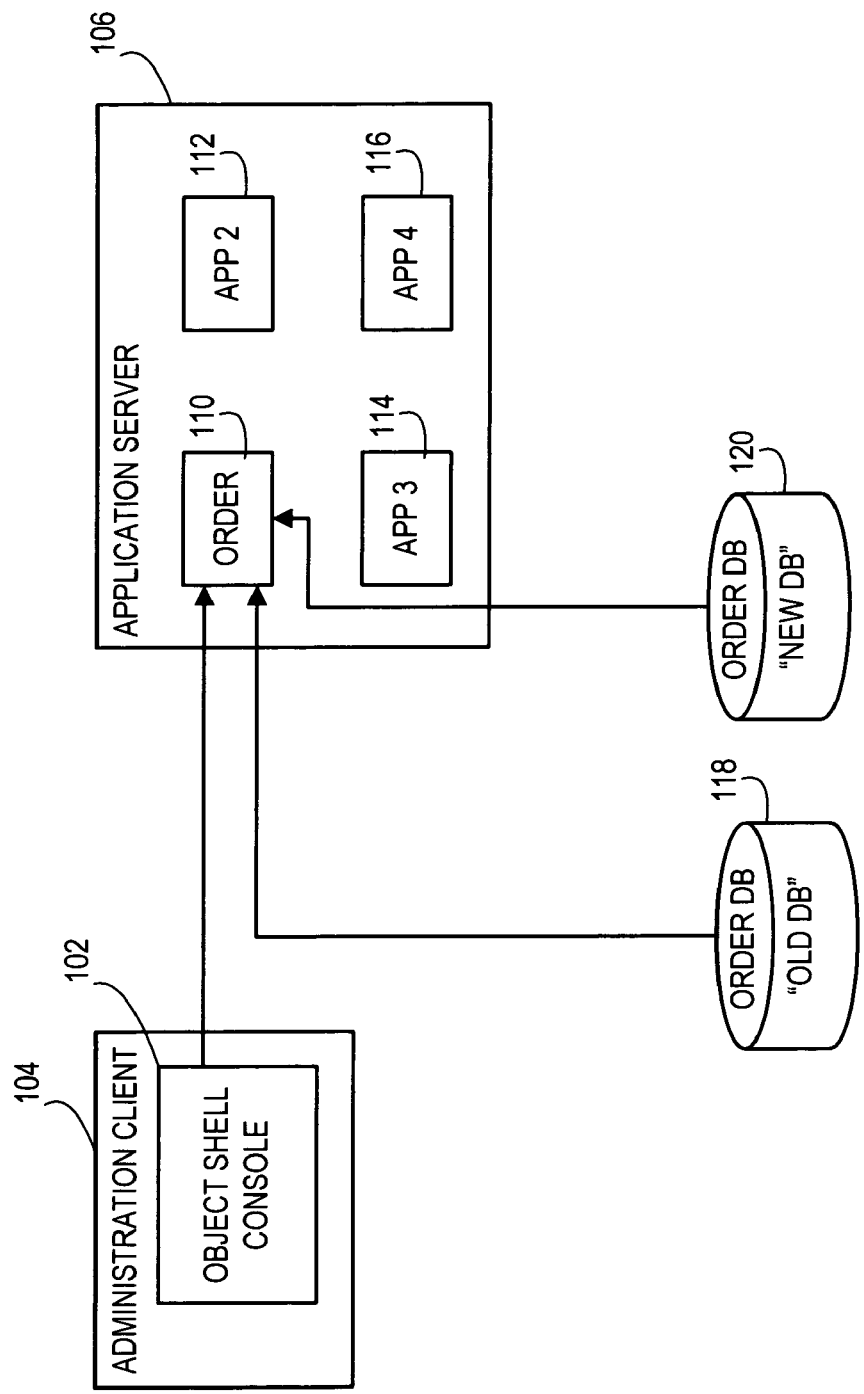
FIG. 1 is a schematic diagram a system for modifying a computer application according to an embodiment of the present invention.

FIG. 1 is a schematic diagram of a system for allowing system operators to upgrade or maintain a computer application while it is executing, according to an embodiment of the present invention. As used herein, the term "system operator" refers to system administrators, operators, software maintenance personnel, programmers or other persons responsible for, or having authority for, maintaining, upgrading, repairing or otherwise modifying applications. In addition, as used herein, the term "modifying" includes upgrading, repairing, maintaining or otherwise modifying a computer software application. An object shell console 102 executes on an administration client 104. Administration client 104 can be any computer that can execute an object shell console 102 having the functionality described herein, including application server 106. Object shell console 102 attaches to an application executing on an application server 106 so that the application can be modified. Importantly, the connection does not suspend or terminate the application to be modified.

Exemplary applications 110, 112, 114 and 116 are illustrated executing on an application server 106. One application, for example, is an order application 110. Order application 110 is used to process orders from customers. Order application 110 is coupled to an order database 118. Order database 118 contains order information required to support order application 110. For example, in an embodiment of the present invention, order database 118 contains inventory data, supplier data and customer data.

In an embodiment of the present invention, object shell console 102 uses attributes of an interpretive programming language, such as the JAVA programming language, to connect to an application that is to be modified without terminating or suspending the application. Once connected, object shell console 102 can extract program data from the application. Program data includes any program information related to the application, including, for example, methods, classes, fields, variable names and values, and arguments passed to or from methods. The program data is displayed to a system operator who uses the program data to modify the executing application without terminating or suspending the executing application. In one embodiment of the present invention, object shell console 102 provides this capability by connecting to the JAVA programming language virtual machine (JVM) on which the application to be modified is executing.

In one embodiment of the present invention, the connection is made using JAVA programming language remote method invocation (RMI). JAVA programming language RMI is a well-known tool that can be used to access one JVM from another JVM. Use of JAVA programming language RMI enables remote invocation and execution of applications and methods. To invoke a remote application (or method), JAVA programming language RMI creates a thread to the other application or method. Creation of the new thread using JAVA programming language RMI occurs without suspending or terminating the executing application.

The application that is connected to and invoked can be either local or remote to administration client 104. Once the connection is established, object shell console 102 has access to the program data of the invoked application. This access results from a feature of the JAVA programming language known as introspection. Introspection was developed for JAVA programming language Beans to allow integrated development environments (IDEs) to visually manipulate graphical components to build applications. The object language components that are used for introspection are Class, Method and Field. When object shell console 102 retains a reference to a running object by creating the thread to the application, these components are used to extract the fields and execute the methods of the object class. The fields of the object can be manipulated to create different behaviors in the object. Methods can be re-executed with argument values supplied by a system operator. The values returned by the method's execution can be displayed for analysis.

Object shell console 102 gains this access without terminating or suspending the invoked application. Thus, once connected, object shell console 102 can determine any classes and methods that are present in the attached application without terminating or suspending the attached application. Because object shell console 102 also has access to the methods in an object, those methods can be re-executed by the system operator to affect the behavior of the application without requiring termination or suspension of the application. The effect on the computer on which the application is running caused by the execution of the method is reflected in the application's execution. Thus, if memory is affected, that effect will carry over to the executing application. For example, using the present invention, an operator can change the value of a variable stored in a computer's memory by a method that sets the value of that variable by re-executing. After the method is re-executed, the application will use the new value created by the method.

As an example, assume that order database 118 crashes and is replaced with new order database 120. New order database 120 is identified by the name "NEW DB." When the database is replaced, the name must be changed to reflect the change. If the database name is not changed, the application will try to perform database operations on the old database name. As a result, in most cases the application will fail to work properly.

In some conventional systems, this change requires suspending or terminating the application and editing a file to make the required name change. After the file is edited, the entire application is recompiled and built. Then the application is restarted. At this point, the database name change is complete, and the application begins to function properly.

In other conventional systems, the change can be performed only at a scheduled maintenance time. At the scheduled maintenance time, a maintenance window is provided that allows a system operator to update the application. In many cases, the application must then be recompiled. Waiting for scheduled maintenance times, or for the application to recompile, can result in significant losses of traffic and revenue for a website.

Using the present invention, a system operator can modify an application without terminating or suspending the application, and without waiting for a scheduled maintenance time. Moreover, the update occurs substantially in real-time because the re-execution of a method in an interpretive environment such as JAVA programming language repopulates computer memory with the desired contents.

An important feature of the present invention is that only the affected method needs to be re-executed. This avoids complex and time-consuming compiles and/or rebuilds of applications. This is a distinct advantage over conventional systems that generally require an entire application to be rebuilt by recompiling and relinking the method. This rebuilding can be very time-consuming, especially for larger applications. Consequently, only re-executing the affected method as opposed to the entire application generally results in significant time savings that translate into significant reductions in any downtime that might be required.

Figure 2:
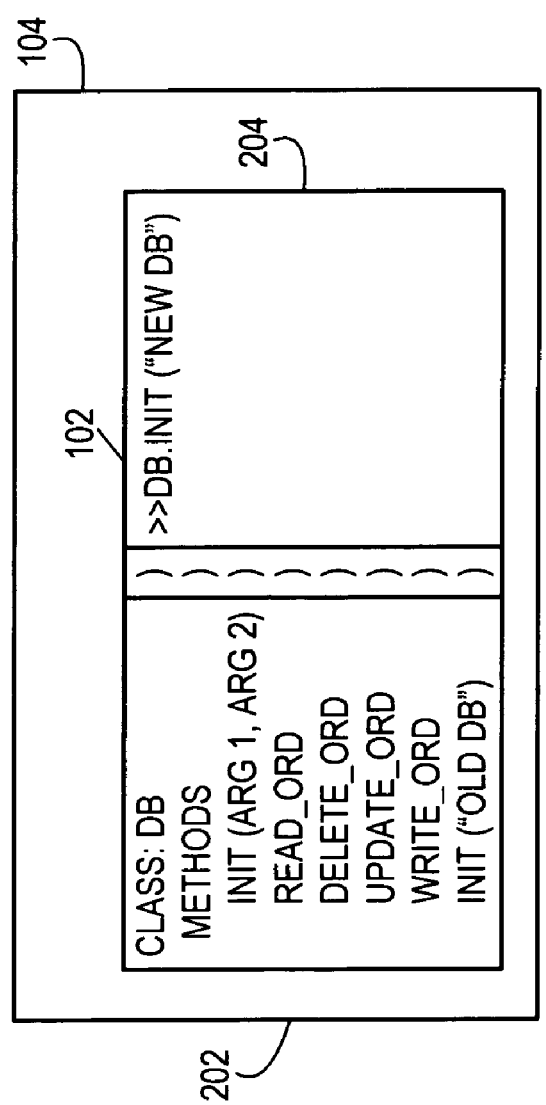
FIG. 2 illustrates an exemplary object shell console 601 for modifying an application by re-executing a method with a new parameter according to an embodiment of the present invention.

An exemplary use of the present invention is described with reference to FIG. 2. FIG. 2 illustrates an exemplary object shell console GUI application by re-executing a method with a new parameter according to an embodiment of the present invention. As shown in FIG. 2, object shell console 102 lists program data associated with a database class. The program data is preferably listed in a program data portion 202 of the GUI of object shell console 102.

The exemplary database class shown in FIG. 2 comprises a READ_ORD( ) method that allows a user to read an order entry from order database 118, a WRITE_ORD( ) method that allows a user to write and order entry to order database 118, a DELETE_ORD( ) method that allows a user to delete an order entry from order database 118 and an UPDATE_ORD( ) method that allows a user to modify an order entry in order database 118. In addition, the database class comprises two INIT( ) methods. Each INIT( ) method has a different number of arguments. It would be apparent to those skilled in the art that as JAVA programming language allows such overloading of methods to accommodate invocation of methods with different numbers of arguments.

When the methods are listed, object shell console 102 also lists any arguments that were passed when the methods were involved. As a result, a system operator would see the wrong database name in the argument list shown. For example, in the present example, the program data listing is INIT ("OLD DB"), which indicates that the database was initialized with the identifier "OLD DB."

Once the system operator discovers the incorrect database name, the system operator can re-execute a method with new parameters to change the value of a variable to fix a problem. To re-execute a method, the system operator enters the method name and correct parameters at a command prompt in a command portion 204 of the GUI of object shell console 102. For example, the system operator can enter DB INIT ("NEWDB") at the command prompt to update the name of the database to reflect the database change.

Alternatively, the system operator can type the method name with no parameters at the prompt in command portion 204. The system operator is then prompted to enter the parameter(s) associated with the method corresponding to the entered method name. The system operator responds to the prompts by typing any required parameters. When all parameters have been entered, the system operator provides an indication that there are no more parameters to be entered in a well-known manner.

The method is then re-executed. By invoking the method while object shell console 102 is connected to the application using JAVA programming language RMI, the memory of the computer on which the application is executing is changed to reflect the new value of the name of the database that was passed in the INIT( ) method. This update occurs without suspending or terminating the executing application. Because the contents of the memory that the application is using have changed, the executing application continues its execution, using the updated contents of memory. Consequently, the application is modified substantially in real-time without suspension or termination. By modifying the application in this manner, downtime is minimized, thus furthering a primary goal of web-based applications.

Figure 3:
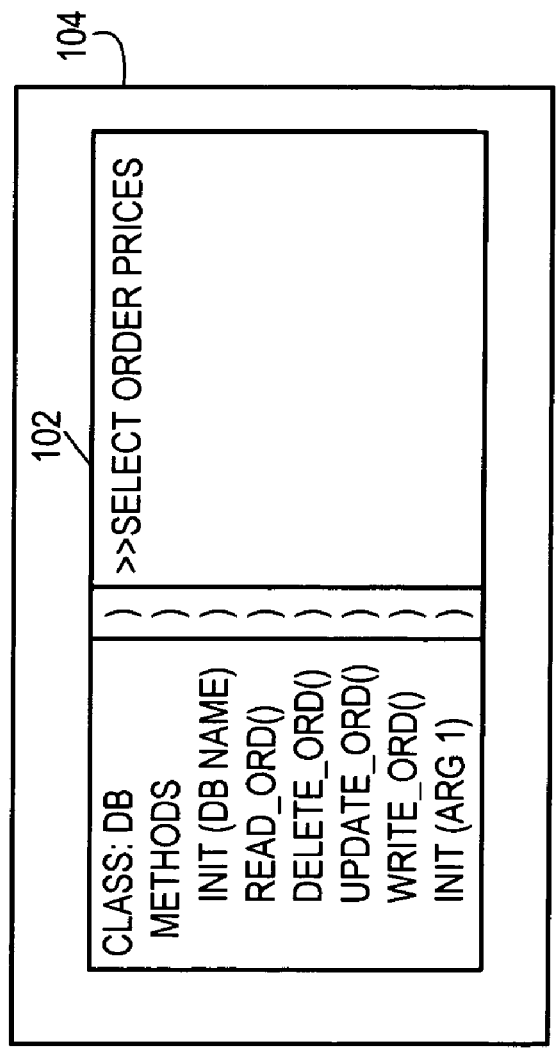
FIG. 3 illustrates an exemplary object shell console GUI for updating an application to input updated data according to an embodiment of the present invention.

FIG. 3 illustrates an object shell console GUI for updating an application to input updated data according to an embodiment of the present invention. In the system associated with the GUI shown in FIG. 3, the contents of database 118 are cached into memory for the system to operate. The cached data comprises the price of each item of inventory in the order database. If the database is changed to update pricing, those changes must be transferred to the data cached in computer memory to affect the application. In conventional systems, the entire application must be suspended and restarted. Restarting the application puts the new price data into the data cache computer memory.

In another example, of the present invention, the price data of the order system is stored in a data structure that is an object variable. This can be a class variable or other static storage technique. Using the present invention, a system operator can avoid suspending and restarting the application. This is done by first attaching to the application using object shell console 102. Then, the system operator issues a SQL SELECT command in the command line of the GUI of object shell console 102. An exemplary command is SELECT ORDER PRICE. This command extracts the new price data from order database 118. That price information is stored in the static price data structure. The updated data will then be used by any other class components that reference this data structure. Therefore, execution of this method by the object shell console provides new pricing information to all the application software that accesses this class for price information. This is done without suspending or terminating the application.

Figure 4:
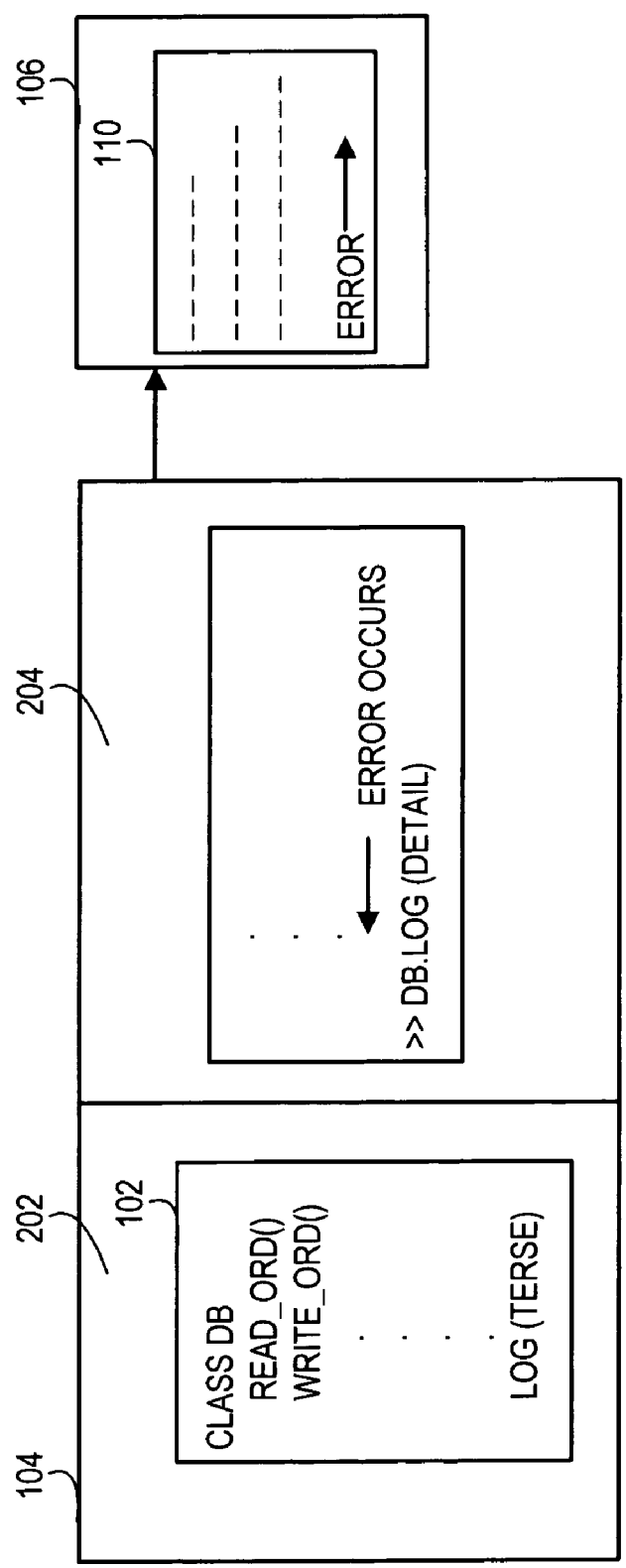
FIG. 4 illustrates an exemplary object shell console GUI for modifying the behavior of an application according to an embodiment of the present invention.

The present invention can also be used to change the behavior of applications without terminating or suspending the application's execution. FIG. 4 illustrates an exemplary object shell console GUI for modifying the behavior of an application according to an embodiment of the present invention. In this example, it is desired to generate detailed status messages when errors are detected. If no errors are detected, then short messages only are sufficient.

While this functionality can be pre-coded into applications, as described above, pre-coding this kind of extra functionality increases the size of the executable that runs in memory as well as increases the size and complexity of diagnostic tools that are used to maintain the system. Using the present invention, however, a programmer does not have to pre-code the extra functionality in the application. Consequently, the executable will be significantly smaller. Moreover, any diagnostic operations, such as debugging, will be greatly simplified due to the reduced size of the executable. Any extra code is stored on a disk. As is well-known to those skilled in the art disk space is relatively inexpensive and plentiful.

Initially, no errors are expected. So the logging class is invoked with the terse logging. Later an error occurs. When the error occurs, an operator or system administrator invokes the detailed logging as shown in FIG. 4. As described above, this is accomplished via the command line. In this case, the command is DB.LOG (DETAIL). After the command is executed, the application will provide detailed logging. This is performed without terminating or suspending the application, or waiting for a scheduled maintenance time.

In another embodiment of the present invention, an application's behavior is modified by changing the order of execution of methods in the application without suspending or terminating the application. For example, if an application is written as a series of method calls, the order of execution of these methods can be modified using the present invention. In one embodiment of the present invention, the order of execution of subroutines is passed to the application as a vector. In this case, the vector is an array of numbers containing the desired order of execution.

Figure 5:
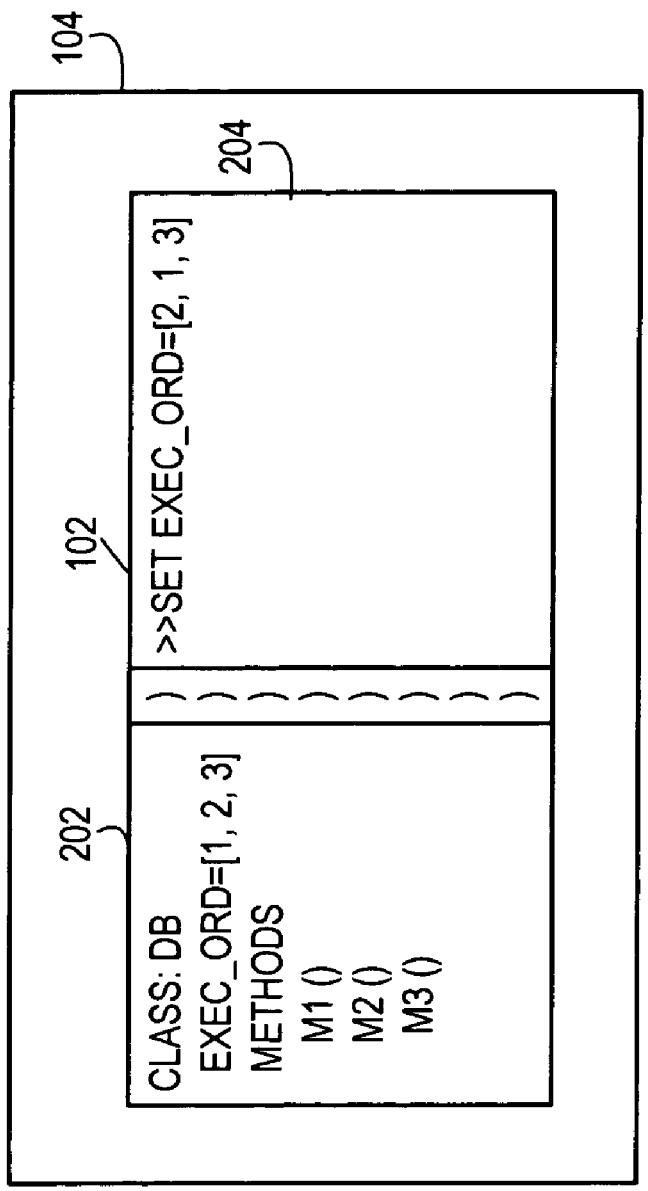
FIG. 5 illustrates another exemplary object shell console GUI for modifying the behavior of an application according to an embodiment of the present application.

As shown in FIG. 5, for example, an EXEC_ORD database stores the order of execution of methods M1, M2 and M3. It is assumed that an application is written that executes methods M1, M2 and M3 in the order given in the EXEC_ORD vector. To modify the behavior of the application, the vector EXEC_ORD is modified. For example, in FIG. 5, the value of EXEC_ORD is changed from [1,2,3] to [2,1,3]. This means that the order of execution of methods M1, M2, M3 changes from M1, M2, M3 to M2, M1, M3.

Figure 6:
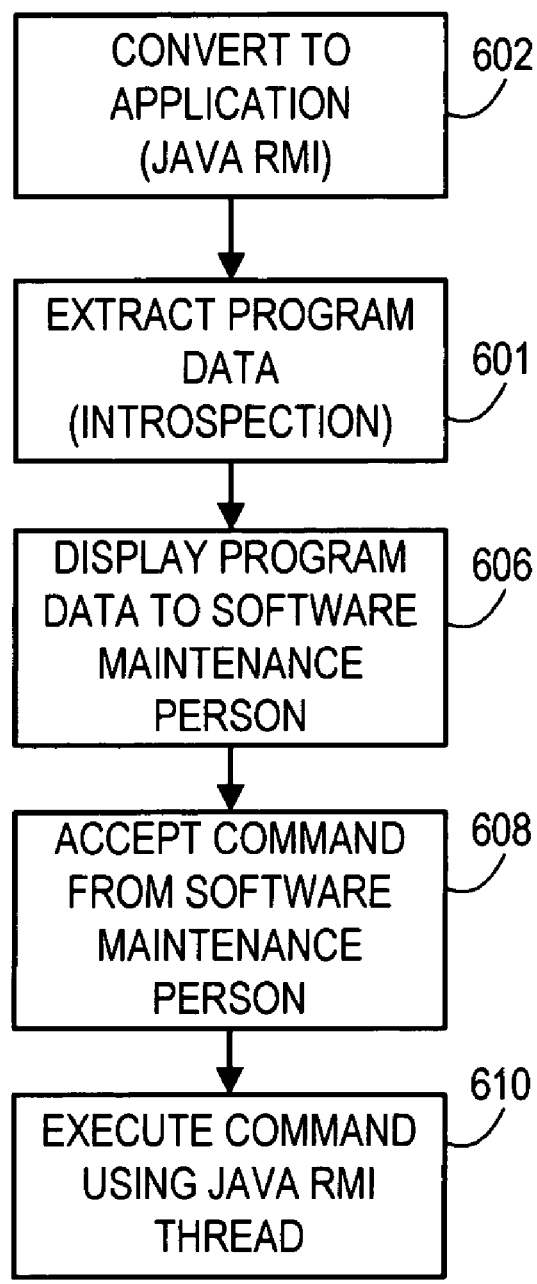
FIG. 6 is a flow diagram illustrating a method for modifying a computer application according to an embodiment of the present invention.

FIG. 6 is a flow diagram for a method for upgrading or otherwise modifying a computer application according to an embodiment of the present invention. In step 602, object shell console 102 attaches to an executing application. As described above, one way to accomplish this attachment is by using JAVA programming language RMI to create a thread that executes the application. In step 601, object console 102 extracts program data from the executing application. In an embodiment of the present invention, step 601 relies on introspection as described above. This program data includes classes, methods, fields and other data comprising the internal program structure of the application. The program data is displayed to the maintenance person in step 606. Preferably, the program data is displayed in data portion 202 of the GUI of object shell console 102.

In step 608, object shell console accepts a command from the software maintenance person. Preferably, the command will upgrade or otherwise modify the executing application. Examples of such modifications include affecting data that is processed by the application as well as the behavior of the application. In step 610, object shell console executes the command to modify the application.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for modifying an application in substantially real-time during execution without suspending or terminating the application, comprising:

an application server running a JAVA virtual machine on which the application executes;

an object shell console that attaches to the application through a JAVA RMI serving as a system independent interface while it is running to obtain program data defining the underlying program structure of the application including at least one object language component;

a graphical user interface in the object shell console that is used to assist a maintenance person in modifying the program data of the application; and a command line for accepting a command to be executed, said command when executed will cause the execution of the application to be modified without suspending or terminating the application.

2. The system recited in claim 1, further comprising:

a vector for establishing an order of method execution in the application:

a command line for entering a new vector comprising a different order for executing the methods in the application; and wherein entering the new vector in the command line establishes the different order of method execution.

3. The system recited in claim 1, further comprising a data cache in a memory of the application server, said data cache being modified by the command.

4. The system recited in claim 1, further comprising:

a terse logging operation that provides terse diagnostic messages;

a detailed logging operation that provides detailed diagnostic messages; and means for allowing a maintenance person to select detailed diagnostic messages if an error occurs without suspending or terminating the application.

5. The system recited in claim 1, wherein the application is written in an interpreter programming language.

6. The system recited in claim 1, wherein the program data comprises at least one method related that is executed in the application, further comprising means for accepting a selection of a method from the program data; and means for invoking the method from the command line with at least one new argument.

7. The system recited in claim 1, wherein the program data comprises at least one method related that is executed in the application, further comprising:

means for accepting a selection of a method from the program data;

a prompt to prompt the maintenance person for at least one new argument value; and means for invoking the method with the at least one new argument value.

8. A system for modifying an executing application in substantially real-time, comprising:

a computer running a JAVA virtual machine on which the application is executing;

means that includes a JAVA RMI system independent interface for attaching to the executing application so that program data that defines the underlying program structure and that includes at least one object language component is extracted from the executing application;

a display device for displaying the program data to a maintenance person;

means for accepting a command from the maintenance person; and means for invoking the command to thereby cause the program data of the application to be modified in accordance with the command without suspending or terminating the application.

9. The system recited in claim 8, wherein the application is written in an interpreter programming language.

10. The system recited in claim 8, wherein the program data includes one or more methods that are executing in the application, further comprising:

means for accepting a selection of a method from the display of the program data; and means for invoking the method from the command line with at least one new argument.

11. The system recited in claim 8, wherein the program data includes one or more methods that are executing in the application, further comprising:

means for accepting a selection of a method from the display of the program data;

a prompt to prompt the maintenance person for at least one argument value; and means for invoking the method with the at least one argument.

\* \* \* \* \*